United States Patent [19]
Jackovitz et al.

[11] Patent Number: 5,183,542
[45] Date of Patent: Feb. 2, 1993

[54] APPARATUS AND METHOD FOR SEPARATING ZIRCONIUM ISOTOPES USING BALANCED ION ELECTROMIGRATION

[75] Inventors: John F. Jackovitz, Monroeville Boro; Richard P. Kunkle, Irwin; Steven H. Peterson, Murrysville, all of Pa.

[73] Assignee: Westinghouse Electric Corp., Pittsburgh, Pa.

[21] Appl. No.: 461,578

[22] Filed: Jan. 5, 1990

[51] Int. Cl.⁵ .............. B01D 57/02; B01D 61/42
[52] U.S. Cl. .............. 204/180.1; 204/299.12
[58] Field of Search .......... 204/182.3, 299.12, 157.21, 204/180.1

[56] References Cited

U.S. PATENT DOCUMENTS

| | | | |
|---|---|---|---|
| Re. 26,913 | 6/1970 | Lewis et al. | 204/101 |
| 3,907,521 | 9/1975 | McConnell | 55/11 |
| 4,290,855 | 9/1981 | O'Farrell | 204/1.5 |
| 4,323,439 | 4/1982 | O'Farrell | 204/180 G |
| 4,389,292 | 6/1983 | Phillips et al. | 204/158 R |
| 4,487,629 | 12/1984 | Siddall | 75/84.4 |
| 4,490,225 | 12/1984 | Lahoda et al. | 204/158 R |
| 4,496,445 | 1/1985 | Nadalin et al. | 204/158 R |
| 4,568,436 | 2/1986 | Feichtner et al. | 204/157.22 |
| 4,584,183 | 4/1986 | Chiang et al. | 423/2 |
| 4,612,097 | 9/1986 | Jackovitz et al. | 204/157.2 |
| 4,752,372 | 6/1988 | Rhodes et al. | 204/299 R |
| 4,767,513 | 8/1988 | Peterson et al. | 204/157.21 |

FOREIGN PATENT DOCUMENTS 50-152194 12/1975 Japan.
1066377 6/1964 United Kingdom.

OTHER PUBLICATIONS

"The Concentration of 39K and 41K by Balanced Ion Migration in a Counterflowing Electrolyte", Science, vol. 104, pp. 136-137, Aug. 1946.

Primary Examiner—John Niebling
Assistant Examiner—Caroline Koestner

[57] ABSTRACT

Both a method and apparatus for separating zirconium isotopes by balanced ion migration in a counterflowing electrolyte are disclosed herein. In the method of the invention, zirconium chloride is dissolved in a solution of HCl, and a voltage of between 2 and 50 volts is applied across the electrolyte to create a flow of zirconium ions toward the cathode, and a counterflow of chlorine ions toward the anode which is balanced such that the lighter weight isotopes of zirconium migrate toward the cathode while the heavier weight zirconium isotopes stay in the vicinity of the anode. The apparatus of the invention includes a polarizing assembly formed from a bundle of small diameter glass tubes aligned between the anode and the cathode. The internal shape of the tubes impedes kinetic agitation movement of the zirconium ions in all directions except in the direction between the anode and the cathode, thereby expediting the separation process. Glass frits are used to partition off the electrolyte in the region of both the anode and the cathode so that the isotopes which eventually accumulate in these regions may be drawn off with a minimum of fluid agitation.

18 Claims, 2 Drawing Sheets

APPARATUS AND METHOD FOR SEPARATING ZIRCONIUM ISOTOPES USING BALANCED ION ELECTROMIGRATION

BACKGROUND OF THE INVENTION

This invention generally relates to separation of isotopes, and is specifically concerned with a method and apparatus for separating zirconium isotopes by balanced ion migration in a counterflowing electrolyte.

The use of zirconium for forming containers or fuel rod cladding for nuclear fuels is well known in the prior art. Zirconium exists as a mixture of isotopes which include zirconium 90, zirconium 91, zirconium 92, zirconium 94 and zirconium 96. Of all these isotopes, zirconium 91 is the least desirable to use in such containers or fuel rod cladding since its relatively high thermal neutron cross section causes it to absorb thermal neutrons and thereby to impede the uranium fission reaction which is desirable in an operational fuel rod assembly. In naturally occurring zirconium, zirconium 91 constitutes only about 11% of the overall weight of the metal, the balance being constituted mostly by zirconium 90 (51.5%), zirconium 92 (17%), and zirconium 94 (17.5%). However, the thermal neutron cross section of zirconium 91 is 158 times more than zirconium 90, 6 times more than zirconium 92, 16 times more than zirconium 96 and 18 times that of zirconium 94 , the 11% by weight component of zirconium 91 in naturally occurring zirconium counts for 73% of the total thermal neutron cross section of naturally occurring zirconium.

The fact that zirconium 91 accounts for almost three quarters of the entire thermal neutron cross section of naturally occurring zirconium has motivated the development of various isotopic separation techniques designed to get rid of or at least reduce the amount of zirconium 91 in naturally occurring zirconium. In one such technique, a compound of zirconium is vaporized and exposed to a pulse of light generated by a $CO_2$ laser tuned to the vibrations of the bond between either zirconium 90 or 91 and the other constituent atoms joined to the zirconium. The tuned pulses of light causes these bonds to resonate and to break, thus liberating either zirconium 90 or zirconium 91, depending upon the frequency of the chosen frequency of the light.

While such laser-induced isotopic separation has proven to be effective for its intended purpose, it is unfortunately expensive, and capable of separating only relatively small amounts of zirconium isotopes at any given time. Hence it does not lend itself to a scaled-up, bulk-separation process that is capable of inexpensively providing the large quantities of zirconium 91-depleted zirconium needed every year for the fabrication of new fuel assemblies and fuel containers.

Other methods are known which employ electrolytic forces to separate isotopes of other elements, such as potassium. In this technique, ions of naturally occurring potassium are introduced into an electrolyte, which may be an aqueous solution of HCl. The electrolyte and dissolved zirconium ions are introduced into a column filled with an inert particulate material which provides a lengthened tortuous flow path for the zirconium ions to travel through, and an electric potential is applied across the column. The voltage of this potential attracts potassium ions and hydrogen ions toward the cathode, while simultaneously creating a counterflow of chlorine ions toward the anode. The voltage is strong enough so that sufficient electrolytic force is applied to the lighter potassium ions to cause a net migration of such ions toward the cathode, but yet is not so strong as to apply such a net migration movement of the heavier ions toward the cathode. Because potassium 41 ions are approximately 5% heavier than potassium 39 ions, they are not as mobile in the fluid medium of the electrolyte, and the electrolytic force applied to them by the cathode is insufficient to overcome the forces of kinetic agitation which causes them to move randomly about the electrolyte in Brownian fashion, and the counterflow of non-potassium negative ions flowing toward the anode gradually causes these heavier potassium ions to migrate toward the anode. Because of the balance between the flow of potassium 39 ions toward the cathode and counterflow of potassium 41 ions toward the anode, no net flow of potassium ions occurs in the electrolyte. Eventually, over a period of time, the region of the electrolyte in the vicinity of the cathode will become enriched in potassium 39, while the region of the electrolyte in the vicinity of the anode will become enriched in potassium 41.

Unfortunately, while the technique of separating isotopes by balanced ion migration has the potential of inexpensively separating bulk amounts of such isotopes, its effectiveness is highly dependent upon the relative weights of the isotopes being separated, as the differences in these weights affects the average velocity of the ions of a particular isotope in a liquid medium. Accordingly, while the approximately 5% difference in weight between potassium 39 and potassium 41 allows balanced ion migration to be practically and effectively used to separate isotopes of potassium, the only 1% difference in weight between atoms of zirconium 90 (which constitutes a little over 50% of all naturally occurring zirconium) and atoms of zirconium 91 significantly impairs the ability of prior art balanced ion migration techniques to effectively separate zirconium 91 from other isotopes of zirconium. Additionally, the effectiveness of such a balanced ion migration technique is easily impaired by the presence of any fluid mixing forces in the electrolyte which may occur from convective currents generated by heat radiated by either electrode, or fluid agitation generated by bubbles of electrolytically produced gases. Finally, such balanced ion migration techniques tend to be slow in effectively separating isotopes.

Clearly, there is a need for both a method and an apparatus for separating isotopes of zirconium which is capable of effectively separating relatively large quantities of zirconium atoms from zirconium 91 atoms. Ideally, such a technique should be fast in operation, so that commercially significant amounts of zirconium deleted in zirconium 91 can be produced for use in the claddings of fuel rods used in nuclear fuel assemblies. Finally, the apparatus used to implement the zirconium isotope separation should be simple and inexpensive in construction, and relatively easy to operate.

SUMMARY OF THE INVENTION

Generally speaking, the invention is both an apparatus and a method for separating zirconium isotopes that avoids or at least ameliorates the shortcomings associated with the prior art.

The method of the invention separates zirconium isotopes in an electrolyte by balanced ion migration which comprises the steps of introducing ions of different isotopes of zirconium into an electrolyte that also includes negative ions, and applying a voltage across the electrolyte with an anode and a cathode of between about 2 and 50 volts to create a flow of zirconium ions toward the cathode, and a counterflow of non-zirconium ions toward the anode that reduces the net transport of zirconium ions across the anode and cathode to zero. The method balances the tendency of the positively charged zirconium ions to be electrolytically drawn toward the cathode against the kinetic agitation of the zirconium ions in the liquid electrolyte. The applicants have observed that the application of a voltage of between about 2 and 50 volts across such an electrolyte is sufficient to impose a small forward drift of the lighter weight isotopes of zirconium over the kinetic agitation of these ions in solution, but is insufficient to overcome such kinetic agitation with respect to the heavier weight zirconium isotopes. Hence the lighter weight zirconium isotopes migrate toward the cathode, while the heavier weight zirconium isotopes migrate in the vicinity of the anode.

To expedite the separation method, the method preferably also includes the step of polarizing the movement of these zirconium ions in the electrolyte along the direction of the flow and counterflow of the positive and negative ions with respect to the anode and cathode. As will be seen in greater detail hereinafter, this step may be implemented by means of a plurality of parallel capillary tubes having very small inner diameters which impede the translational movement of the ions due to kinetic agitation in all directions except in the direction between the anode and the cathode, thereby greatly expediting the separation process.

The electrolyte is characterized by a selected pH, and the method may also include the step of maintaining this selected pH during the flow and counterflow of the ions in the electrolyte so that the electric current flow induced through the electrolyte by the voltage remains substantially constant. In the preferred embodiment, the electrolyte is an aqueous solution of HCl having a molarity of between 0.5 and 3 which is maintained by the constant additions of additional HCl to make up for the hydrogen and chlorine that is evolved at the cathode and the anode. The maintenance of a constant pH in the electrolyte generates a counterflow of chlorine ions that applies a constant and uniform resistance to the flow of zirconium ions toward the cathode, and further maintains the electrical conductivity of the electrolyte at a level which avoids the generation of excessive heat, which in turn can result in the unwanted mixing of the electrolyte as a result of heat-generated convection currents.

In the final steps of the method of the invention, the electrolyte in the vicinity of the anode and cathode are carefully drained in such a way as to minimize fluid agitation, and the zirconium ions contained therein are precipitated out of solution with an ammonia compound.

The apparatus of the invention generally comprises a column for containing an electrolyte that includes zirconium ions of different isotopes as well as negatively charged ions, such as chlorine ions, an anode and a cathode disposed at different ends of the column. The cathode and anode apply a voltage across the electrolyte that is sufficient to cause the lighter zirconium ions to migrate toward the cathode and to generate a counterflow of non-zirconium ions which is sufficient to cause the heavier zirconium ions to migrate toward the anode. The apparatus further includes a polarizing assembly for polarizing the molecular movement of the zirconium ions between the anode and the cathode such that the motion of these ions is impeded in all of the directions except between the anode and cathode. In the preferred embodiment, the polarizing assembly is a bundle of capillary tubes, each of which has an inner diameter on the order of approximately 0.5 millimeters, whose open ends are disposed in alignment with the anode and the cathode of the apparatus.

The apparatus may further include first and second liquid permeable partitions, such as glass frits, disposed in the column between the anode and the polarizing assembly and the cathode and the polarizing assembly for both partitioning off the regions of the electrolyte rich in certain isotopes of zirconium, as well as for preventing bulk mixing from occurring in the electrolyte contained within the column as a result of heat and gas bubbles generated by the electrodes. The anode and the cathode may be formed at least in part by an inert metal, such as platinum, to minimize corrosion. Finally, the apparatus may include a draining assembly having a withdrawal port located between the anode and the cathode and the polarizing assembly for withdrawing an electrolyte rich in a particular zirconium isotope without agitating the electrolyte.

Both the method and the apparatus provide a means for separating bulk amounts of heavier from lighter isotopes of zirconium in a fashion that is relatively quick and inexpensive.

BRIEF DESCRIPTION OF THE SEVERAL FIGURES

DETAILED DESCRIPTION OF THE PREFERRED EMBODIMENT

Figure 1:
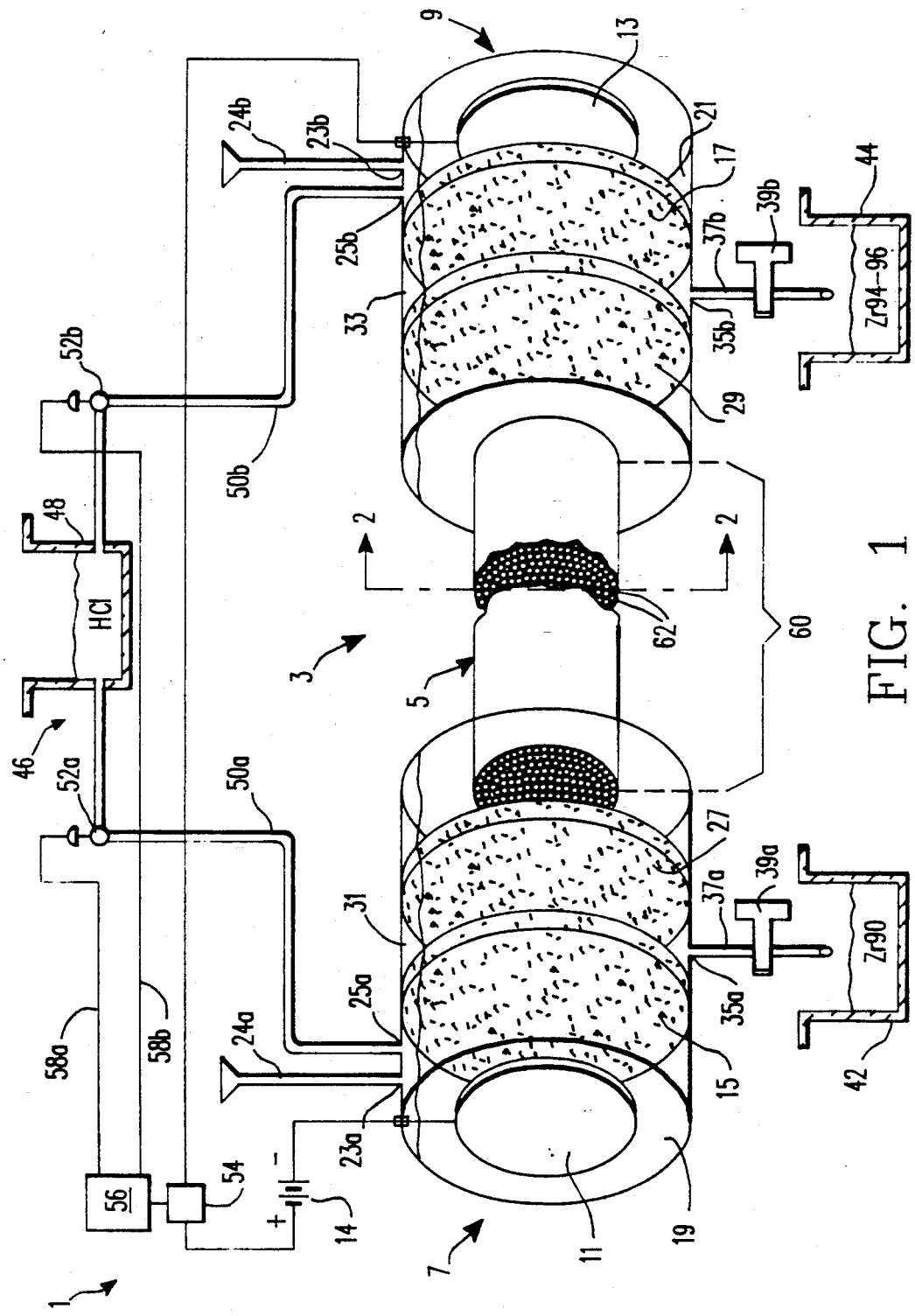
FIG. 1 is a perspective, semi-schematic view of the isotopic separation apparatus of the invention.

With reference now to FIG. 1, wherein like FIGURES designate like components throughout all the several figures, the isotopic separation apparatus 1 of the invention generally comprises a column assembly 3 having a central tubular portion 5 that is flanked by a cathode housing portion 7, and an anode housing portion 9. The cathode and anode housing portions 7 and 9 house a cathode 11 and anode 13, respectively. In the preferred embodiment, the cathode 11 and anode 13 are both formed from a non-corrosive metal, such as platinum. The cathode 11 is connected to the negative pole of a voltage source 14, while the anode 13 is connected to the positive pole of the source 14. As will be discussed in detail hereinafter, the voltage source 14 applies an electric potential of anywhere between 2 and 25 volts across the cathode 11 and anode 13, and preferably about 5 volts in the method of the invention. Such a range of voltages generates the desired flow of zirconium ions toward the cathode 11 and the balance counterflow of chlorine ion toward the anode 13 necessary to affect isotopic separation.

Both the cathode housing portion 7 and anode housing portion 9 include an electrode-isolating frit 15 and 17, respectively, for defining a separate cathode chamber 19 in the cathode housing portion 7, and an anode chamber 21 in the anode housing portion 9. Each of these electrode-isolating frits 15 and 17 are preferably of medium porosity which in turn allows the ions in the electrolyte contained within the column assembly 3 to flow fairly easily between the cathode and anode chambers 19 and 21 without the conduction of any significant amount of fluid currents. Both the cathode chamber 19 and anode chamber 21 include a vent outlet 23a, 23b for allowing the escape of gases reduced by the cathode 11 and anode 13. Specifically, vent outlet 23a at the top of the cathode chamber 19 allows the escape of electrolytically reduced hydrogen gas, while the vent outlet 23b exposed at the top of the anode chamber 21 allows the escape of electrolytically reduced chlorine gas. Cathode chamber 19 and anode chamber 21 each further include an HCl replenishment inlet 25a and 25b for receiving an aqueous solution of hydrogen chloride from HCl replenishment assembly 46 (discussed in further detail hereinafter).

The electrode-isolating frits 15 and 17 effectively isolate the electrolyte contained in the balance of the column assembly 3 from the fluid agitation generated by the constantly rising bubbles of hydrogen and chlorine gas streaming upwardly across the faces of the cathode and anode 11 and 13. These frits 15 and 17 further isolate the balance of the electrolyte from the small but still significant convective heat currents generated by the anode and cathode as a result of the passage of electric current through them from the voltage source 14. Finally, these frits 15 and 17 isolate the balance of the electrolyte in the column assembly 3 from fluid agitation caused by the constant introduction of a aqueous solution of hydrogen chloride from the HCl replenishment assembly 46 through the ports 25a and 25b which is performed all during the separation method of the invention to make up for the constant losses of hydrogen and chlorine which occurs as a result of electrolysis, and to maintain the pH of the electrolyte at a constant level.

Both the cathode housing portion 7 and anode housing portion 9 each further include a second, column isolating frit 27 and 29, respectively. These isolating frits 27 and 29 define drain chambers 31 and 33 in the housing portions 7 and 9 as shown. Each of these drain chambers in turn includes a drain port 35a, 35b for draining off electrolyte that has been enriched in either $Zr_{90}$, or $Zr_{92}$, $Zr_{94}$ or $Zr_{96}$. To this end, each of the drain ports 35a, and 35b is connected to a drain tube 37a and 37b. Each of these drain tubes 37a and 37b includes a burette-type stop-cock 39a and 39b for allowing the drainage of the isotopic solution contained within the drain chambers 31 and 33 in a slow and controlled manner. Commercially available and electronically controlled microvalves may, of course, be substituted for the burette-type valves 39a and 39b. The outlet ends of each of the drain tubes 37 and 39 are disposed over collecting vessels 42 and 44 as shown.

As has been indicated previously, the separation apparatus 1 includes an HCl replenishment assembly 46 for replenishing the hydrogen and chlorine ions in the electrolyte that have been reduced into gas by the cathode 11 and anode 13. To achieve this, the replenishment assembly 46 includes a reservoir 48 of aqueous HCl having a pair of conduits 50a and 50b which are connected to the previously mentioned replenishment inlets 25a and 25b located at the top of both the cathode and anode chambers 19 and 21. The flow of aqueous HCl through each of the conduits 50a and 50b is controlled by electronically operated microvalves 52a and 52b. During the operation of the apparatus 1, the modulation of these microvalves 52a and 52b is in turn controlled by the combination of a current sensor in the form of an ammeter 54 and a microprocessor 56. As is schematically illustrated in FIG. 1, the ammeter 54 is connected between the cathode 11 and anode 13. As hydrogen and chlorine gas are evolved at the cathode and anode 11, 13 during the operation of the apparatus 1, the pH changes, and hence the electrical conductivity of the electrolyte contained within the column assembly 3 increases. Since the voltage source 14 applies a constant voltage between the cathode and the anode 11 and 13, this increase in electrical resistance reduces the amount of current flowing between these electrodes. This decrease in electrical current is sensed by the ammeter 54, whose output is in turn connected to the input of the microprocessor 56. The microprocessor 56 is programmed to maintain the flow of current between the cathode and anode 11 and 13 to between certain limits. Accordingly, when the current sensed by the ammeter 54 falls below the lower limit of this program, the microprocessor 56 will transmit electrical control signals through outlet cables 58a and 58b thus causing the electronically operated microvalves 52a and 52b to open and to thereby conduct a sufficient amount of the concentrated, aqueous solution of HCl contained in the reservoir 48 for the current flowing between the cathode and anode 11 and 13 to increase to the upper limit of the program of microprocessor 56, whereupon the microprocessor 56 will close the valves 52a and 52b.

Figure 2:
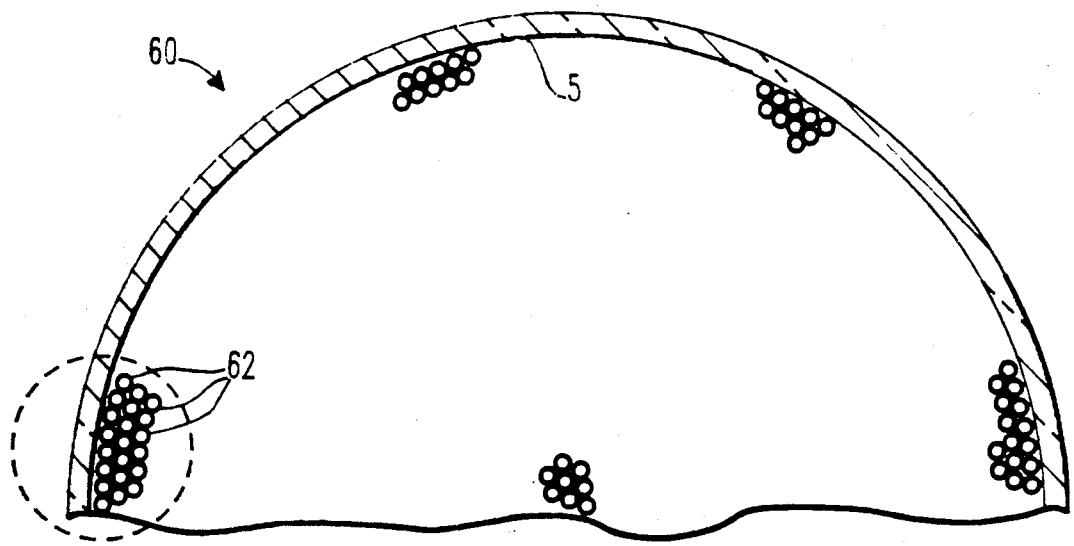
FIG. 2 is a cross-sectional view of the central tubular portion of the separation apparatus illustrated in FIG. 1 along the line 2—2, showing how the polarization assembly of the apparatus is formed from a bundle of densely-packed glass capillary tubes.
Figure 3:
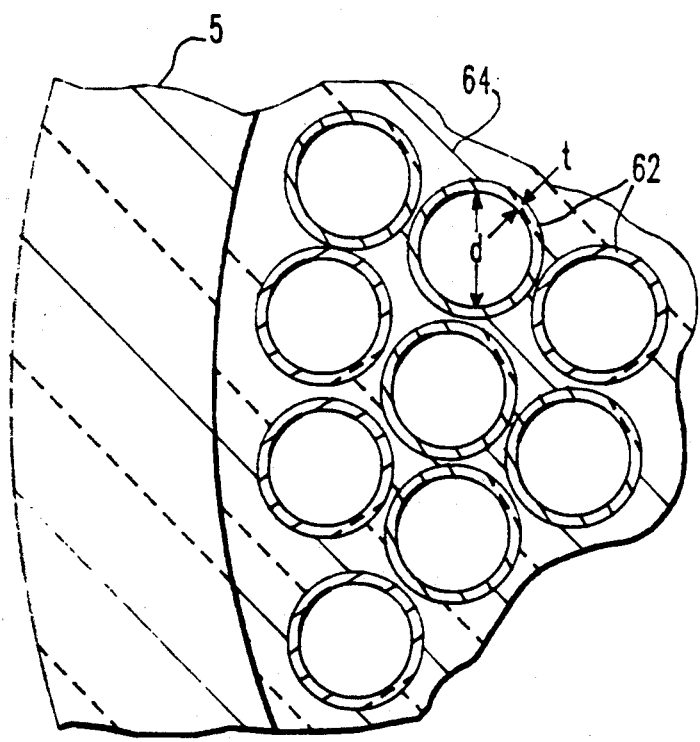
FIG. 3 is an enlargement of the cross-sectional view illustrated in FIG. 2 within the dotted circle.

As is best seen in FIGS. 2 and 3, the central tubular portion 5 of the column assembly 3 includes a polarization assembly 60 formed from a bundle of individual capillary tubes 62. In the preferred embodiment, each of the tubes 62 is a commercially-available capillary tube of the type used in nuclear magnetic resonance instrumentation. Such tubes have an inner diameter d of approximately 0.5 millimeters, and a tube wall thickness t of approximately 0.1 millimeters. These tubes 62 are preferably clustered together in a dense-pack, triangular-pitch arrangement. The tubes 62 are preferably between about 12 and 20 centimeters in length, and the small inner diameter of these tubes exerts capillary forces on the ions present in the electrolyte which retards their Brownian motion in all directions and thus enhances separation. Additionally, as is best seen in FIG. 3, the interstices between the individual tubes 62 is preferably completely filled in with a filler 64 which may be a fusible glass or hardenable plastic material. Filler 64 may be for example, any one of a number of acrylic plastics. The filling in of the interstices by a filler 64 insures that no streaming or other non-uniform fluid flow will occur at any point in the cross-section of the polarization assembly 60.

Figure 4:
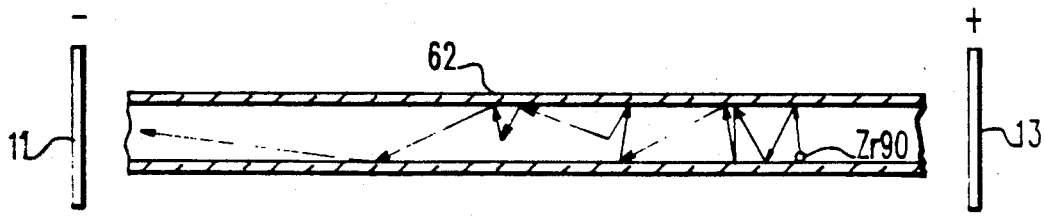
FIG. 4 is a cross-sectional side view of one of the capillary tubes used in the polarization assembly, illustrating how it guides the random movement of a typical zirconium ion toward an electrode.

The operation of the polarization assembly 60 may best be understood with respect to FIG. 4, which illustrates how the Brownian motion of a typical zirconium ion is effectively impeded in all directions except in the direction between the cathode 11 and anode 13 of the column assembly 3. The selected retardation of such random, kinetic movement of the zirconium ions provides a separation column which is just as effective as columns employing inert particulate packings to increase the average travel distance of the zirconium ions so as to enhance the isotopic separation thereof, but greatly increases the separation achieved over a given unit of time since axial movement between the cathode and anode 11 and 13 remains relatively unencumbered.

In the method of the invention, the column assembly 3 is filled with an electrolyte formed from a maximum amount of a zirconium salt, such as, that has been dissolved. Alternatively, $Zr(NO_3)_4$ may be used. Preferably, the 0.10 molar solution of HCl is saturated with the zirconium salt. When $ZrCl_4$ is used, the resulting electrolyte is approximately 1.67% $ZrCl_4$.

Next, the voltage source 14 is electrically connected between the cathode 11 and anode 13. While voltages of anywhere between 2 and 50 volts would be operable, voltage source 14 preferably applies a voltage of about 5 volts. Shortly after the voltage source 14 has been connected to the cathode and anode 11 and 13, both the ammeter 54 and microprocessor 56 are actuated. The microprocessor is programmed to interpret the first reading that it receives from the ammeter 54 as the "base line" current that it will strive to maintain during the operation of the apparatus 1. While the current measured by the ammeter 54 will depend upon the specific dimensions of the column assembly 3 and the specific molarity of the HCl aqueous solution in the type of zirconium salt dissolved in it, the applicant has found that current densities on the order of approximately 100 milliamps per square centimeter of cross-sectional area of column should be typical.

The operator of the apparatus 1 should maintain the application of a 5 volt potential between the cathode 11 and anode 13 for at least about 96 hours, and preferably over about 360 hours before attempting to drain electrolyte out of the drain chambers 31 and 33. While results may vary depending upon the flow-counterflow characteristic achieved between the zirconium and chlorine ions in the electrolyte, the applicants believe that the highest concentration of non-zirconium 91 will be achieved in the anode housing portion 9 of the column assembly since the weight difference is substantially greater between zirconium 94 and zirconium 96 and zirconium 91 than between zirconium 90 and zirconium 91.

After the separated zirconium isotopes have been drained into the collecting vessels 42 and 44, the zirconium is precipitated out of solution by the addition of an aqueous solution of ammonia. The precipitates are then recovered, drained, dried and the resulting zirconium nitrate refined back into metallic zirconium by conventional refinement techniques.

We claim:

1. A method for separating zirconium isotopes by balanced ion migration in a counterflowing electrolyte solution, comprising the steps of:
   introducing ions of different isotopes of zirconium into an electrolyte solution that includes non-zirconium ions, and
   applying a voltage across said electrolyte solution with an anode and a cathode of between about 2 and 50 volts to create a flow of zirconium ions toward said cathode, and to create a counterflow of said non-zirconium ions toward said anode that reduces the net transport of zirconium ions across said anode and cathode to zero, thereby causing the lighter weight isotopes of zirconium to migrate through said electrolyte solution toward the cathode while the heavier weight zirconium isotopes migrate through said electrolyte solution toward the anode.

2. A method for separating zirconium isotopes by balanced ion migration in a counterflowing electrolyte, comprising the steps of:
   introducing ions of different isotopes of zirconium into an electrolyte that includes non-zirconium ions, wherein said electrolyte is characterized by a selected pH,
   applying a voltage across said electrolyte with an anode and a cathode of between about 2 and 50 volts to create a flow of zirconium ions toward said cathode, and to create a counterflow of said non-zirconium ions toward said anode that reduces the net transport of zirconium ions across said anode and cathode to zero, and maintaining said selected pH during said counter flow of non-zirconium ions in said electrolyte so that the electric current flow induced in the electrolyte by said voltage remains substantially constant, whereby the lighter weight isotopes of zirconium migrate toward the cathode while the heavier weight zirconium isotopes migrate toward the anode.

3. A method for separating zirconium isotopes as described in claim 1, further including the step of polarizing the kinetic movement of said zirconium ions in said electrolyte along the direction of said flow and counterflow.

4. A method for separating zirconium isotopes as described in claim 1, wherein said ions of different isotopes of zirconium are introduced into said electrolyte by dissolving a zirconium compound into said electrolyte.

5. A method for separating zirconium isotopes as described in claim 4, wherein said zirconium compound is a zirconium salt.

6. A method for separating zirconium isotopes as described in claim 4, wherein said zirconium compound is $ZrCl_4$.

7. A method for separating zirconium isotopes as described in claim 1, wherein said voltage is between about 2 and 25 volts.

8. A method for separating zirconium isotopes as described in claim 1, further including the step of partitioning off various sections of the electrolyte between said anode and said cathode to define regions of said electrolyte that are enriched in different isotopes of said zirconium ions and to prevent bulk mixing.

9. A method for separating zirconium isotopes as described in claim 8, further including the step of removing the electrolyte from at least one of said regions and reducing and removing the zirconium ions from the electrolyte of said region to produce zirconium that is enriched with one or more selected isotopes.

10. A method for separating zirconium isotopes as described in claim 9, wherein the zirconium ions present in said removed electrolyte are reduced through precipitation with a caustic compound.

11. An electrolyte comprising zirconium and non-zirconium ions produced by the method defined in claim 2 wherein the proportions of the various isotopes of zirconium contained with the electrolyte is different from the proportions of the various isotopes of zirconium initially introduced into the electrolyte.

12. An electrolyte as defined in claim 11, wherein naturally occurring zirconium is used to produce the zirconium ions initially introduced into the electrolyte includes a lesser proportion of zirconium 91 than naturally occurring zirconium.

13. A method for separating zirconium isotopes by balanced ion migration in a counterflowing electrolyte, comprising the steps of:

dissolving a zirconium compound into an electrolyte characterized by a selected pH that includes non-zirconium ions to introduce ions of different isotopes of zirconium into said electrolyte;

applying a voltage across said electrolyte with an anode and a cathode of between about 2 and 25 volts to attract a flow of zirconium ions toward said cathode, and to create a counterflow of said non-zirconium ions toward said anode that is sufficient to impede the migration of the heavier isotopes of zirconium toward the cathode but not sufficient to impede the flow of lighter isotopes of zirconium toward the cathode, whereby the net transport of said zirconium ions across said anode and cathode is zero, and maintaining the selected pH of said electrolyte during the counterflow of non-zirconium ions in said electrolyte so that the electrical resistance of said electrolyte and hence the electrical current induced by said voltage remains substantially constant.

14. A method for separating zirconium isotopes as described in claim 11, wherein said electrolyte is an aqueous solution of HCl with a selected pH of between 0.5 and 3.0.

15. An electrolyte comprising zirconium and non-zirconium ions produced by the method defined in claim 14 wherein the proportions of the various isotopes of zirconium in the HCl solution is different from the proportions of the various isotopes of zirconium initially introduced into the electrolyte.

16. A method for separating zirconium isotopes as described in claim 13, wherein the pH of said electrolyte is selected so that the electrical resistance of said electrolyte is sufficient at said voltage range of 2 and 25 volts to limit the current to a level such that the heat generated by said current within said electrolyte does not significantly agitate said electrolyte.

17. A method for separating zirconium isotopes as described in claim 13, further including the step of partitioning off various sections of the electrolyte between said anode and said cathode to define regions of said electrolyte that are enriched in different isotopes of said zirconium ions, and to prevent bulk mixing from occurring in said electrolyte.

18. A method for separating zirconium isotopes as described in claim 13, further including the step of impeding the movement of said zirconium ions within said electrolyte in all directions except as between said anode and said cathode.

* * * * *